United States Patent
Smitt et al.

(10) Patent No.: US 6,295,383 B1
(45) Date of Patent: Sep. 25, 2001

(54) INTENSITY CORRECTION IN AN OPTICAL SCANNER

(75) Inventors: Asbjørn Smitt, Aalsgaarde; Michael Rindsig, Frederiksberg; Jørgen Rasmussen, Bagsværd, all of (DK)

(73) Assignee: Contex A/S, Allerod (DK)

( * ) Notice: Subject to any disclaimer, the term of this patent is extended or adjusted under 35 U.S.C. 154(b) by 0 days.

(21) Appl. No.: 09/170,394

(22) Filed: Oct. 13, 1998

(51) Int. Cl.$^7$ ..................................................... G06K 9/40
(52) U.S. Cl. .......................... 382/274; 382/275; 358/461; 358/474
(58) Field of Search ..................... 382/274, 275; 358/406, 446, 461, 474

(56) References Cited

U.S. PATENT DOCUMENTS

| | | | |
|---|---|---|---|
| 5,500,745 | * 3/1996 | Iishiba et al. | 358/461 |
| 5,519,441 | * 5/1996 | Gusmano et al. | 348/207 |
| 5,802,217 | * 9/1998 | Suzuki et al. | 382/274 |
| 5,970,181 | * 10/1999 | Ohtsu | 382/274 |
| 5,987,186 | * 11/1999 | Oida et al. | 382/274 |
| 6,035,072 | * 3/2000 | Read | 382/275 |

\* cited by examiner

Primary Examiner—Thomas D. Lee
(74) Attorney, Agent, or Firm—Merchant & Gould P,C, (57) ABSTRACT

An optical scanner and a method of operating an optical scanner comprising: a light source, a line detector detecting pixel intensity information, and a computer having a memory wherein the computer is capable of controlling the optical scanner such that the detected pixel intensity can be adjusted and wherein the memory holds a procedure comprising the steps of: initially generating line profile data comprising pixel intensity information by scanning a reference, initially generating first smoothed line profile data comprising pixel intensity information by scanning a background, whenever required generating second smoothed line profile data comprising pixel intensity information by scanning a background. Based on the profile data, generating the variance between said first smoothed line profile data and said second smoothed line profile data, generating the combination of said variance and said line profile data, and adjusting the detected pixel intensity to compensate for pixel variations in the optical scanner. Thus it is possible to correct detected pixel intensities in an optical scanner.

23 Claims, 9 Drawing Sheets

Profile A

Profile B

Profile C

Profile D

INTENSITY CORRECTION IN AN OPTICAL SCANNER

FIELD OF THE INVENTION

This invention relates to the field of correcting detected pixel intensities in an optical scanner.

BACKGROUND OF THE INVENTION

By means of optical scanners it is possible to obtain an electronic representation of printed information on a document. The electronic representation is obtained by detecting light intensities reflected from small picture elements (pixels) arranged in a line covering the spatial extent of the document subject to scanning. The light intensities from the pixels on the document are detected by means of some type of pixel intensity detectors providing electrical signals that comprises intensity levels. In order to scan the document efficiently and sufficiently fast the light intensities are detected by some type of line detector (e.g. using charge coupled devices, CCD's) having an array of pixel intensity detectors detecting the intensity of multiple pixels on the document in a single shot. Typically, the pixel intensity detectors are of some type of semiconductor material and are arranged on a common substrate. Despite the fact that the intensity detectors are arranged on a common substrate and that a document subject to scanning is completely uniformly coloured, the intensity detectors do not provide exactly the same intensity levels. This may be due to different sensitivities of the individual intensity detectors and due to the camera detecting light from the original through an optical system having different light paths for each pixel. The sensitivities of the individual intensity detectors change very slowly over time under normal operation conditions. To conclude, each intensity detector in the camera converts the intensities on the original to intensity levels by means of pixel-to-pixel varying coefficients which can vary considerably from pixel to pixel but is substantially constant in time for each individual pixel.

Typically, the document is illuminated by some type of light source e.g. a fluorescent light tube when the document is scanned. However, the light source will not illuminate the field of view of the line detector on the document uniformly. By field of view is understood pixels of which the line detector is capable to detect intensity levels when the camera and the document are held fixed relative Lo each other. The non-uniform illumination will distort the detection of the information on the document and thereby also distort the electronical representation of the document. This effect will affect the response of the individual pixel intensity detectors, however this contribution to the response will vary rather smoothly from one pixel to its neighbouring pixel ie across pixels. This contribution to the response should not be confused with the sensitivities for the individual pixels. The illumination of the document will change significantly as a function of temperature and time.

In the prior art the detected intensity levels are corrected by a set of amplification values in order to compensate for the non-uniform illumination. In optical scanners e.g. in the so-called roller-fed scanners where the document is moved past the line detector in order to scan the entire document with a single line detector, the amplification values are obtained by scanning the line profile data of a uniform white background just before a document subject to scanning is moved in front of the line detector. In such scanners the document is also moved past and, in particular, in contact with the background in order to support the document under the line detector during scanning. Therefore, the background will deteriorate rather quickly, which means that e.g. scratches may appear in the surface. Further, particles coming off the document due to the mechanical moving of the document results in that the background will become dirty. In order to remove spikes in the line profile data arising from scratches and dust in/on the background i.e. to provide reliable amplification values, line profile data in the form of intensity levels arising from scanning the background is soothed or low-pass filtered.

So, there exists a problem in the prior art that the information regarding the individual and across pixels varying sensitivities is diminished due to the low-pass filtering. When monochromatic scanners are considered this results in the minimal obtainable signal-to-noise ratio in the electronic representation of the document being determined by the variation in the pixel-specific sensitivities. Additionally, when multicolour scanners are considered, colour distortions will appear. The colour distortions will be seen as distinct single colour strikes when the electronical representation of the document is viewed. This is because the colour representation is obtained by detecting the intensity at a number of different colours e.g. the colours red, green, and blue by means of an individual detector for each colour. An example can be considered: if a document having a uniform white surface is scanned and the intensity level provided by the line detector for a specific pixel on a detector detecting red intensity information is, wrongly, relatively large compared to the detected intensity levels of the colours green and blue, then this pixel will appear as having a red tint although it should have been white.

SUMMARY OF THE INVENTION

A first object of the invention is to provide an optical scanner which is capable of correcting detected intensity levels for pixels individually and without having to perform time-consuming scans of a reference background whenever the across pixels smooth intensity profile changes.

This is achieved when the optical scanner comprises a light source; a line detector detecting pixel intensity information; a computer having a memory wherein the computer is capable of controlling the optical scanner such that the detected pixel intensity can be adjusted and wherein the memory holds a procedure comprising the steps of: initially generating line profile data comprising pixel intensity information by scanning a reference; initially generating first smoothed line profile data comprising pixel intensity information by scanning a background; whenever required generating second smoothed line profile data comprising pixel intensity information by scanning a background; generating the variance between said first smoothed line profile data and said second smoothed line profile data; generating the combination of said variance and said line profile data; adjusting by said combination the detected pixel intensity to compensate for pixel variations in the optical scanner.

Consequently, the optical scanner is capable of providing corrected intensity levels which are compensated for across pixels varying sensitivities while the corrected intensity levels are updated for relatively smooth across pixels variations caused by eg changes in illumination of the document without delaying the process of scanning documents, ie without involving any mechanical operation in the update of the corrected intensity levels.

A second object of the invention is to provide a method by use of which it is possible to correct detected intensity levels for pixels individually and without having to perform time-consuming scans of a reference background whenever the across pixels smooth intensity profile change.

This is achieved when the method comprises the steps of: initially generating line profile data comprising pixel intensity information by scanning a reference; initially generating first smoothed line profile data comprising pixel intensity information by scanning a background; when required generating second smoothed line profile data comprising pixel intensity information by scanning a background; generating the variance between said first smoothed line profile data and said second smoothed line profile data; generating the combination of said variance and said line profile data; using said combination to compensate for pixel variations in the optical scanner.

Alternatively, this is achieved when the method comprises the steps of: initially scanning a reference and a background in order to generate line profile data and first smooth line profile data, respectively; compensating detected pixel intensities during scanning of a document by means of said line profile data; when required, scanning the background in order to obtain second smooth line profile data; further compensating detected pixel intensities during scanning of a document for changes in said second smooth line profile data relative to said first smooth line profile data.

Consequently, it is possible to provide corrected intensity levels which are compensated for across pixels varying sensitivities while the corrected intensity levels are updated for relatively smooth across pixels variations caused by e.g. changes in illumination of the document without delaying the process of scanning documents i.e. without involving any mechanical operation in the update of the corrected intensity levels.

BRIEF DESCRIPTION OF THE DRAWINGS

The invention will be explained more fully below in connection with a preferred embodiment and with reference to the drawings, in which.

DETAILED DESCRIPTION OF A PREFERRED EMBODIMENT

Figure 1:
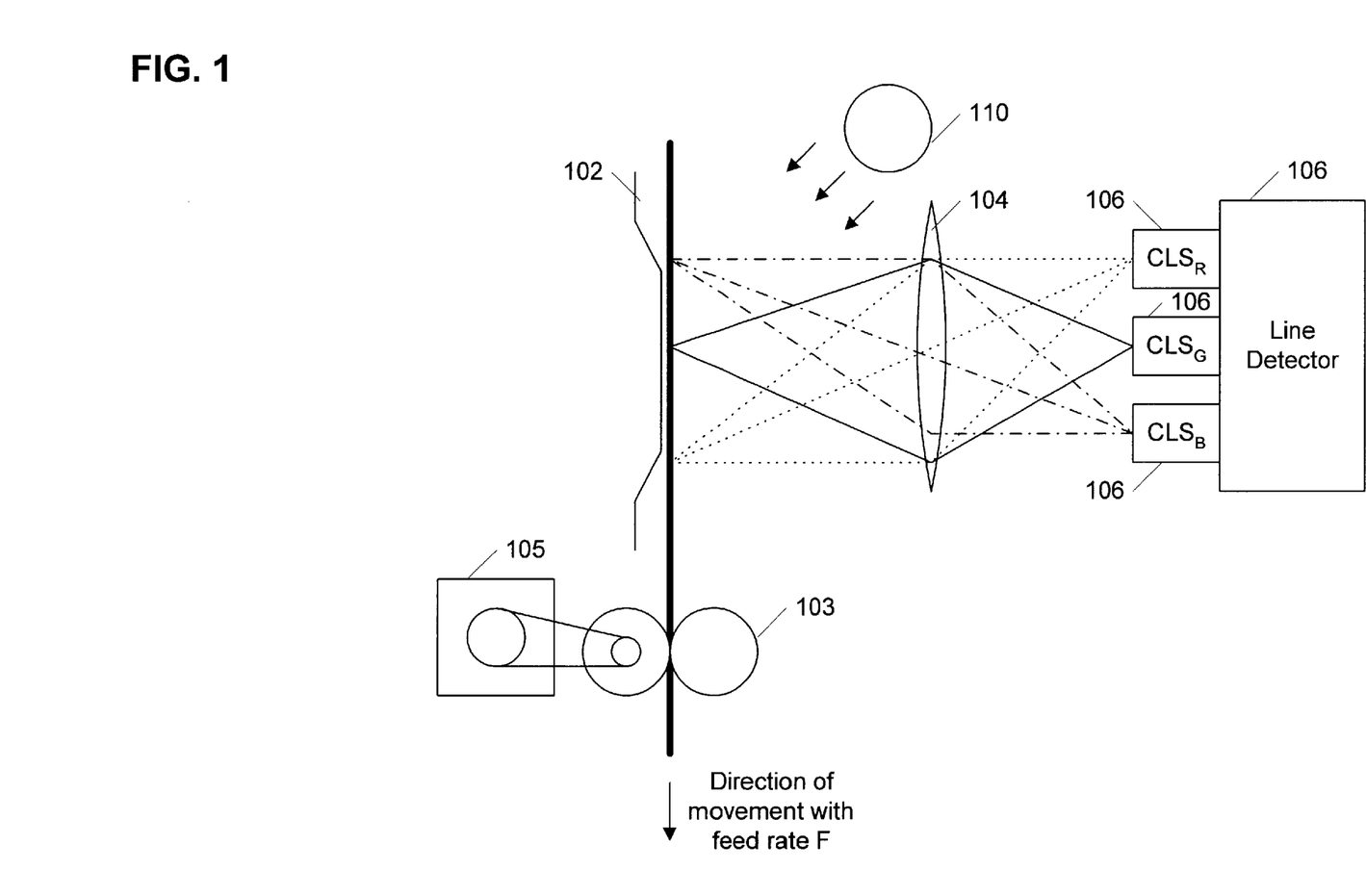
FIG. 1 shows a schematic view of an optical scanner.

FIG. 1 shows a schematic view of an optical scanner. Here a document 101 is being scanned as it is moved over the background 102 by the feed rollers 103 driven by the motor 105 in the direction indicated by the arrow with a feed rate F. The feed rate F can be adjusted by the user or automatically according to a predefined resolution. The document 101 is illuminated by the light source 110. The points being scanned are captured through the lens system 104 by the line detector 106, which have one colour line sensor (CLS) for each of the colours red, green and blue, respectively.

Figure 2:
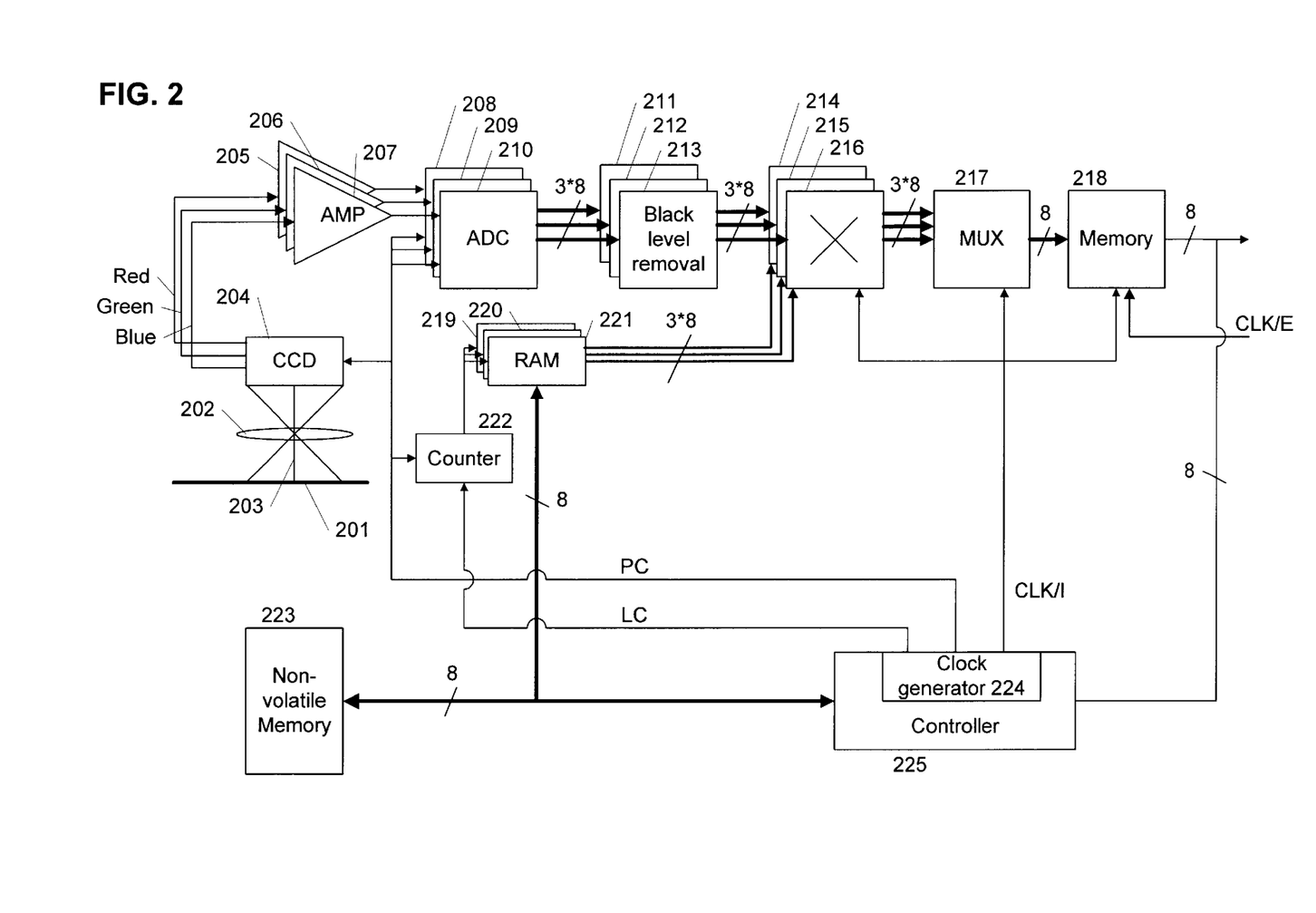
FIG. 2 shows a block diagram of a preferred embodiment of a colour scanner according to the invention.

FIG. 2 shows a block diagram of a preferred embodiment of a colour scanner according to the invention. The colour scanner scans lines on a document 201, successively. An image sensor e.g. comprised by a lens system 202 having an optical axis 203 images lines on the document 201 onto three colour line sensing arrays 204, e.g. a CCD unit with a colour line sensor (CLS) for each channel (red, green and blue). Each of the colour line sensors (CLS) have a number of cells arranged on a line and adapted to detect light reflected from a picture element (a so-called pixel) on the document 201. When the respective cells has been exposed to light reflected from the original for a sufficient period of time and responses in the form of analogue voltages from the cells have been detected, the document is moved slightly for scanning a next line.

The analogue voltages from the cells of the colour line sensors 204 are clocked out by using a pixel clock signal PC provided by a clock generator unit 224 associated with the controller 225 of the scanner. Sequences of analogue voltage levels originating from the respective cells of the respective colour line sensors are transferred from the colour line sensors 204 to amplifiers 205–207 for amplification. The amplified analogue signals are converted into e.g. 8-bit signals for each colour (red, green and blue) in analogue-to-digital converters (ADC) 208, 209, and 210. The conversion is controlled by the pixel clock PC. The ADCs are capable of removing any black level offset from each pixel, caused by e.g. black level differences in the cells of the colour line sensors. If this offset was not removed, the following amplification would not be correct as the amplified pixels would include the amplified black level offset. Alternatively the black level removal circuits can be external blocks (i.e. not an integrated part of the ADCs 208, 209, and 210). The external black level removal blocks are shown as 211, 212, and 213.

Prior to scanning a document, a reference in the form of a uniform white background has been scanned. Thereby, reference line profile data are obtained and stored in non-volatile memory 223. Also prior to scanning a document, further reference line profile data are obtained and stored in non-volatile memory 223 by scanning the normal white scanner background used to support a document during scanning. Both sets of line profile data are based on averaging several scanned lines in order to reduce noise. The stored line profile data contain data from all three colour channels (red, green and blue).

Since the individual cells in the colour line sensors 204 can have different sensitivities in the detection of light, the signal levels from the cells equalised to provide a flat output response over a line. A normal procedure for equalising the output is to scan a reference background in advance (prior to equalisation), whereby the controller unit 225 has been able to calculate the sensitivity for each of the cells in the colour line sensors 204.

This knowledge is used to determine an amplification factor for each of the cells in the array. These amplification factors are transferred from the controller 225 to RAM memories 219, 220, and 221. A counter 222 is reset by a line clock signal LC from the clock generator unit 224 and is increased by one each time it receives a pixel clock pulse. The counter value represents the pixel number in a line and is transferred to the RAM memories 219, 220, and 221 for addressing the corresponding amplification factors (one for each colour channel). The amplification factors are transferred to multipliers 214, 215, and 216 in which the digitised pixel value is compensated with the corresponding amplification factor and thus producing the amplified output values which are multiplexed into a single channel by the multiplexer 217 and stored in a memory 218, from where it is available for a connected computer (not shown) connected to receive the digital representation of a scanned document.

To avoid the dependency on the condition of the normal white scanner background, which can be scratched and dirty, the equalisation is based on the reference line profile data, obtained from scanning the white reference background previously, and stored in the non-volatile memory 223. The line profile data from the present normal scanner background is read into the RAM memory 218. The controller 225 reads the line profile data from RAM memory 218, filters it using a low-pass filter and compares it with low-pass filtered line profile data based on the normal scanner background which was previously stored in non-volatile memory 223. The difference between the two sets of line profile data (caused by temperature changes of the light source etc.) is added to the second set of line profile data in the non-volatile memory 223, which were based on a clean white reference scanner background. The result is used to calculate amplification values which are transferred from the controller 225 to the RAM memories 219, 220, and 221 are thereby ready for use.

Preferably, the line profile data is filtered using a median filter having a filter length corresponding to 1 to 3 cm. However, other filter types and other filter lengths can be used.

The operation of the multipliers 214, 215, and 216, the multiplexer 217 and the RAM memory 218 is controlled by the clock generator 224 with the CLK/I signal. The transfer of data from RAM memory 218 to a connected computer is controlled by the clock-signal CLK/E.

Figure 3:
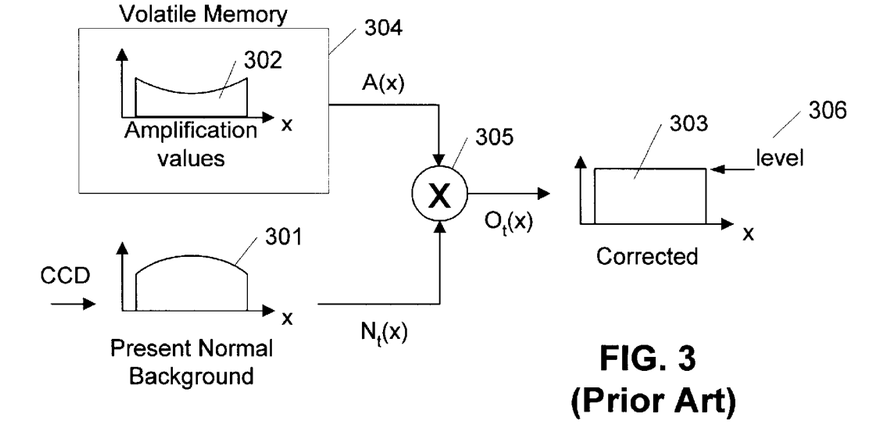
FIG. 3 shows a prior art embodiment of pixel correction using amplification values.

FIG. 3 shows a prior art embodiment of pixel correction using amplification values. In this embodiment, a white background is scanned, and line profile data from a single colour line sensor (CLS) is obtained. The uncorrected line profile data 301 are multiplied by the calculated corresponding amplification values 302 stored in volatile memory 304:

$$A(x) = \frac{O_t(x)}{N_t(x)} = \frac{level}{N_t(x)}$$

where level is the desired constant amplitude of the corrected output level 306 and x is the pixel position along the line resulting in the corrected line profile data 303:

$$O_t(x) = N_t(x) \cdot A(x) = level$$

Figure 4:
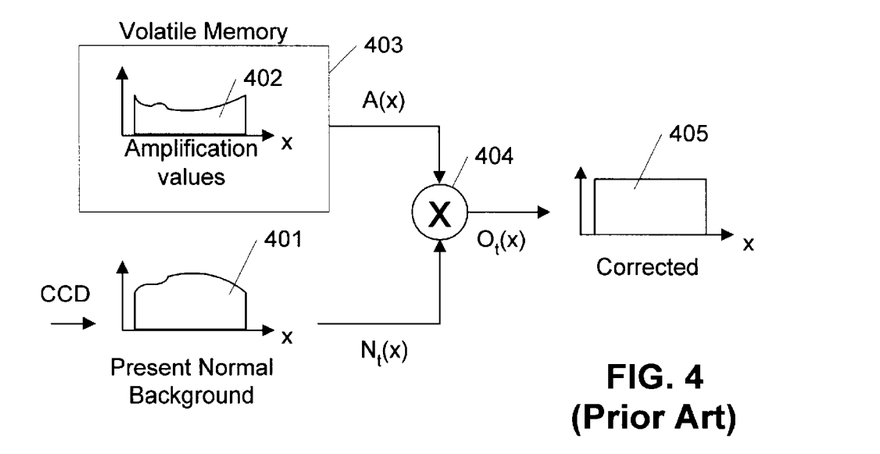
FIG. 4 shows a prior art embodiment of pixel correction with a deteriorated background.

If the uncorrected line profile data (i.e. the white background) contains scratches or imperfections, the output will still be corrected if the calculation of the amplification values is based on these line profile data, as seen in FIG. 4.

FIG. 4 shows prior art embodiment of pixel correction with a deteriorated background. The uncorrected line profile data 401 with a small 'dent' (e. g. caused by a dirty spot on the white background) is used to calculate the amplification values 402 stored in volatile memory 403 similar to FIG. 3. The 'dent' is reflected in the amplification values 402 and after the multiplication 404, the resulting output is once again the corrected line profile data 405. If the 'dent' in the uncorrected line profile data is caused by a dirty spot or scratches on the white background, these imperfections will be covered to the colour line sensors by the original during scanning, but as they are still reflected in the amplification values, the resulting output is not correct. This is shown in FIG. 5.

Figure 5:
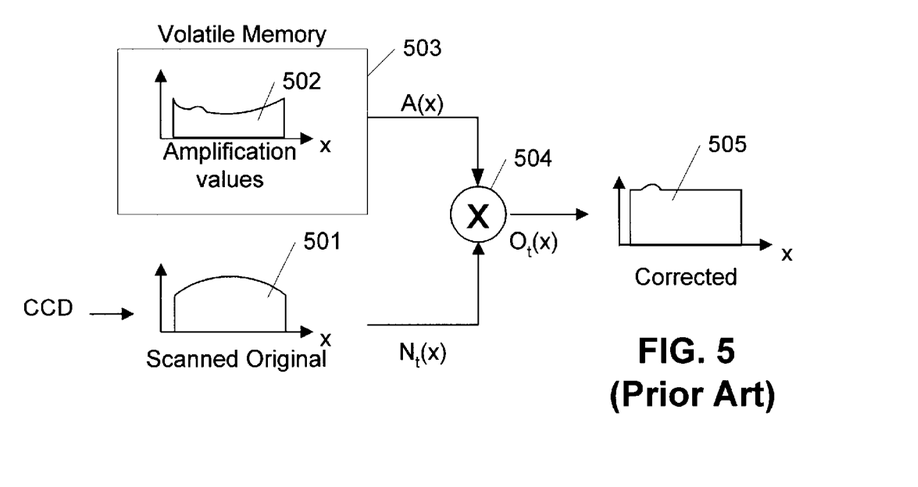
FIG. 5 shows a prior art embodiment of pixel correction when scanning an original, and the amplification values are based on a deteriorated background.

FIG. 5 shows a prior art embodiment of pixel correction when the amplification values are based on a deteriorated background. The amplification values 502 in volatile memory 503 were calculated from the 'dented' white background (as in FIG. 4) and when the input signal 501 is no longer the white background but the input from the scanned original (assumed to be white in FIG. 5 for simplicity), the part of the original covering the 'dent' will not be amplified correctly, resulting in the 'dented' output profile data 505.

This is a severe problem in a colour scanner because the red, green and blue CCD colour line sensors (CLS) are mutually offset, as seen in FIG. 1. If a scratch e.g. covers a part of the background seen by the red CCD colour line sensor only, the corresponding pixels will be amplified too much in the red part, and the result is red stripes in the output signal.

According to the present invention, a modified set of amplification values is used, based on not only the present line profile data input from the colour line sensors (CLS), but also on two sets of line profile data stored in non-volatile memory for each colour line sensor (CLS). The stored sets of line profile data are the line profile data obtained from a clean white reference background and the line profile data obtained from the normal white background. The two sets of line profile data may be scanned and stored initially, e.g. at the factory producing the scanner, at first use of the scanner, or at the start of every day.

The generation of the two sets of stored reference line profile data can preferably be accomplished by calculating the average of e.g. 128 scanned line profile data of the reference background and the normal white background in order to reduce signal noise.

The reference background has a clean white surface without scratches or imperfections. The corresponding stored line profile data thus contains the true non-filtered value for each single pixel, and the information about the pixel-to-pixel variations is preserved.

The line profile data from the normal background can be stored at approximately the same time as the line profile data from the reference background.

When a scanner needs to correct the output signal, it will compare the input line profile data from the colour line sensors (CLS) to the normal line profile data stored in non-volatile memory (i.e. from the same background). The difference between these two sets of line profile data (each of them low-pass filtered) is caused by e.g. changes in the light source, the lens system and CCD pixel sensitivity, and this relative change should be added to the stored reference line profile data:

$$M_t(x) = Ref_{TO}(x) + \frac{N_t(x) - N_{TO}(x)}{N_{TO}(x)} \cdot Ref_{TO}(x)$$

where $M_t(x)$ is the modified line profile data, $Ref_{TO}(x)$ and $N_{TO}(x)$ are the line profile data from the reference background and the normal background respectively, stored at time $T_O$. $N_t(x)$ is the input from the CCD colour line sensors (i.e. from the normal background).

In a first preferred embodiment of the invention, the solution without approximation is used:

$$M_t(x) = Ref_{TO}(x) + \frac{N_t(x) - N_{TO}(x)}{N_{TO}(x)} \cdot Ref_{TO}(x)$$

The speed of the calculations will be low in this case due to the divide/ multiply operations involved.

As the two sets of stored line profile data are stored at approximately the same time, it is possible to simplify the calculations (to make the correction faster) by using the approximation:

$$\frac{Ref_{TO}(x)}{N_{TO}(x)} \approx 1$$

as $N_{TO}(x)$ is low-pass filtered to remove information about scratches, etc, from the line profile data. This reduces the modified line profile data to:

$$M_t(x) \approx Ref_{TO}(x) + (N_t(x) - N_{TO}(x))$$

In a second preferred embodiment of the invention this approximated solution is implemented. The benefit of this method is the calculation speed, because it can be implemented using only additions and subtractions in a logic circuit or in software.

Figure 6:
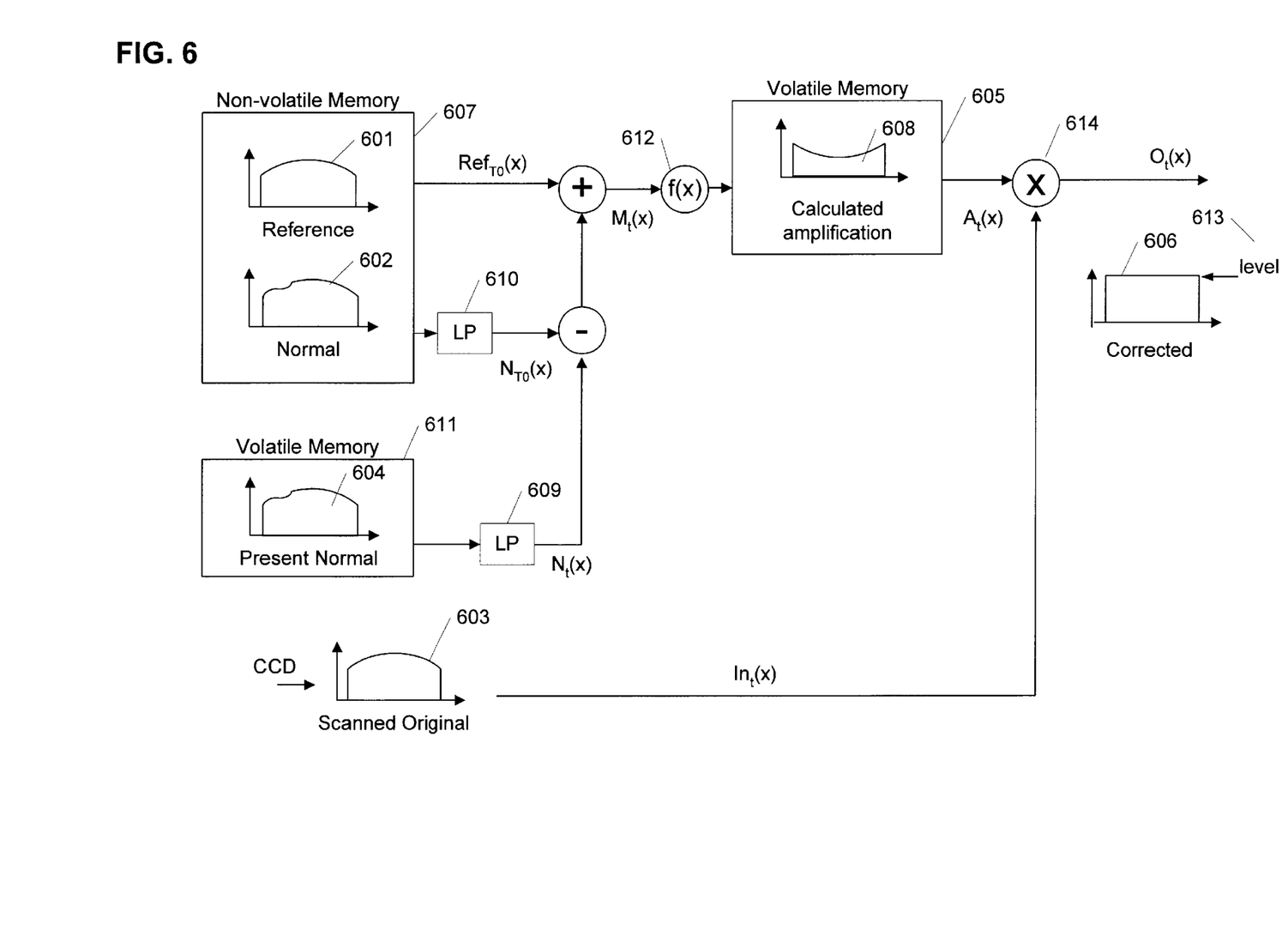
FIG. 6 shows an implementation of pixel correction using modified amplification values according to the invention when scanning an original, and the amplification values are based on a deteriorated background.

FIG. 6 shows an implementation of pixel correction using modified amplification values according to the invention. The two sets of line profile data stored at time $T_O$ in non-volatile memory 607 are the line profile data from the reference background 601 and the line profile data from the normal background 602. The line profile data from the normal background are shown in this figure as 'dented' for illustration purposes only. Line profile data from the normal background 604 is obtained from the CCD colour line sensors at time t and placed in volatile memory 611. The time t can be e.g. before a scan or a group of scans or alternatively at regular time intervals or as a continuous process.

All three sets of line profile data are used to calculate the modified line profile data $M_t(x)$. The signal $N_t(x)$ is the line profile data from the normal background at time t passed through low-pass filter 609, and $N_{TO}(x)$ is the line profile data from the normal background stored at time $T_O$ passed through low-pass filter 610. The difference between $N_t(x)$ and $N_{TO}(x)$ is added to $Ref_{TO}(x)$ and the result is used as input to an amplification calculator 612 implementing f(x). The amplification values 608 are stored in volatile memory 605 and are calculated as:

$$f(x): A_t(x) = \frac{O_t(x)}{M_t(x)} = \frac{level}{M_t(x)} = \frac{level}{Ref_{TO}(x) + N_t(x) - N_{TO}(x)}$$

where level is the desired constant amplitude of the corrected output level 613.

In a second preferred embodiment of the invention (without the approximation) the function f(x) will be:

$$f(x): A_t(t) = \frac{O_t(x)}{M_t(x)} = \frac{level}{M_t(x)} = \frac{level}{Ref_{TO}(x) + \frac{N_t(x) - N_{TO}(x)}{N_{TO}(x)} Ref_{TO}(x)}$$

In other embodiments of the invention, other suitable functions f(x) are possible.

The input signal 603 from an original being scanned (shown here as white for simplicity only) is multiplied by the amplification values through multiplier 614, and the result is the corrected output 606:

$$O_t(x) = A_t(x) \cdot In_t(x)$$

As can be seen from FIG. 6, the quality of the corrected output signal 606 depends mainly on the quality of the stored reference line profile data 601.

Figure 7:
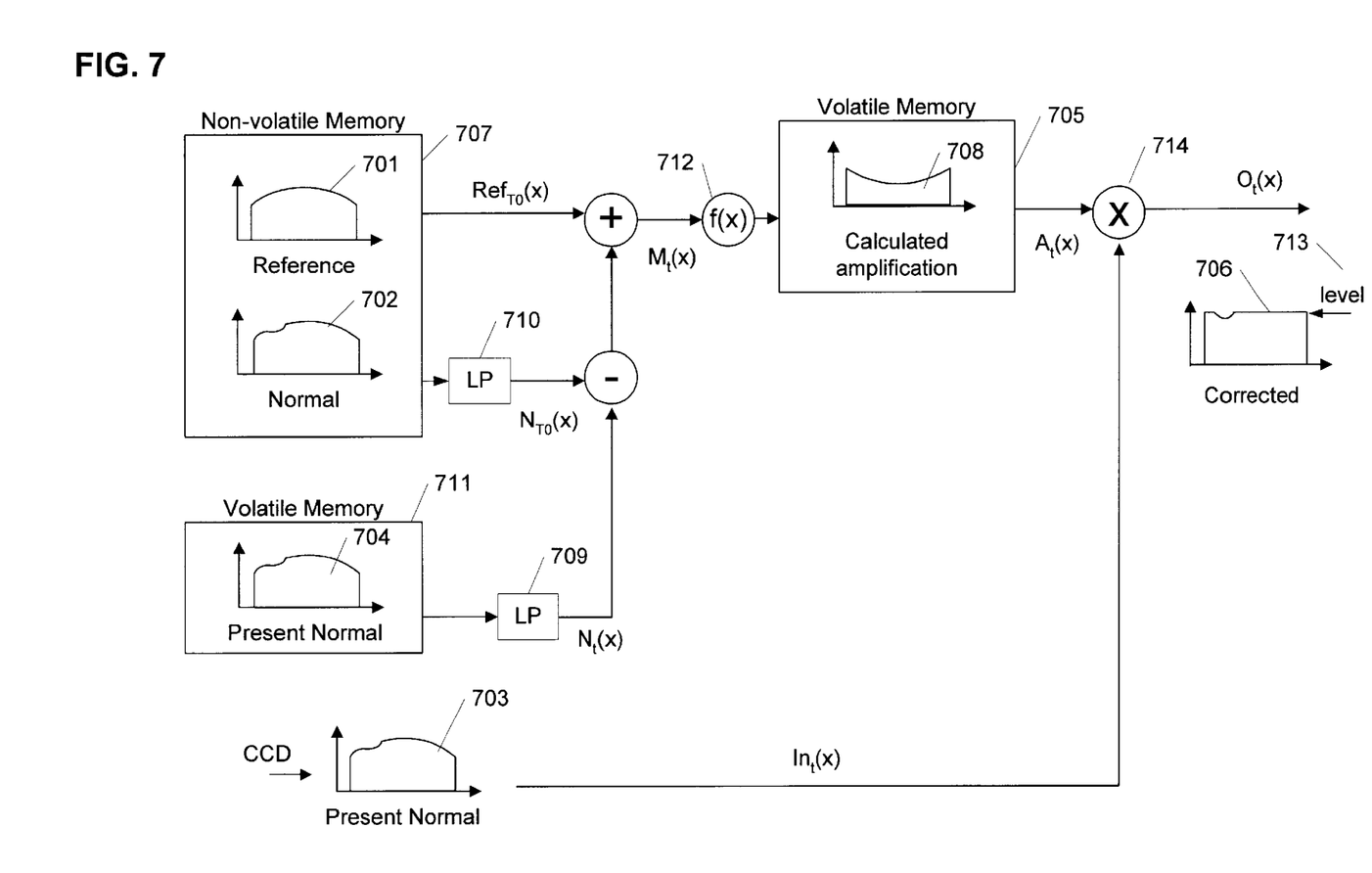
FIG. 7 shows the implementation of pixel correction using modified amplification values according to the invention, based on a deteriorated background.

If no original is being scanned, the input signal from the CCD colour line sensors will be the line profile data from the normal background as illustrated in FIG. 7.

FIG. 7 shows the implementation of pixel correction using modified amplification values according to the invention, when the background is deteriorated. FIG. 7 is similar to FIG. 6 except for the input signal 703. If the normal background contains dents or scratches (as illustrated in the line profile data from the normal background 703, 702 and 704), these are not reflected in the amplification values 708 because they are 'cancelled out' in the difference signal ($N_t(x) - N_{TO}(x)$). As a result the scratches will reappear in the output signal 706. This is correct, because imperfections on the normal background should not be compensated for as they are covered by the original during scanning.

Figure 8:
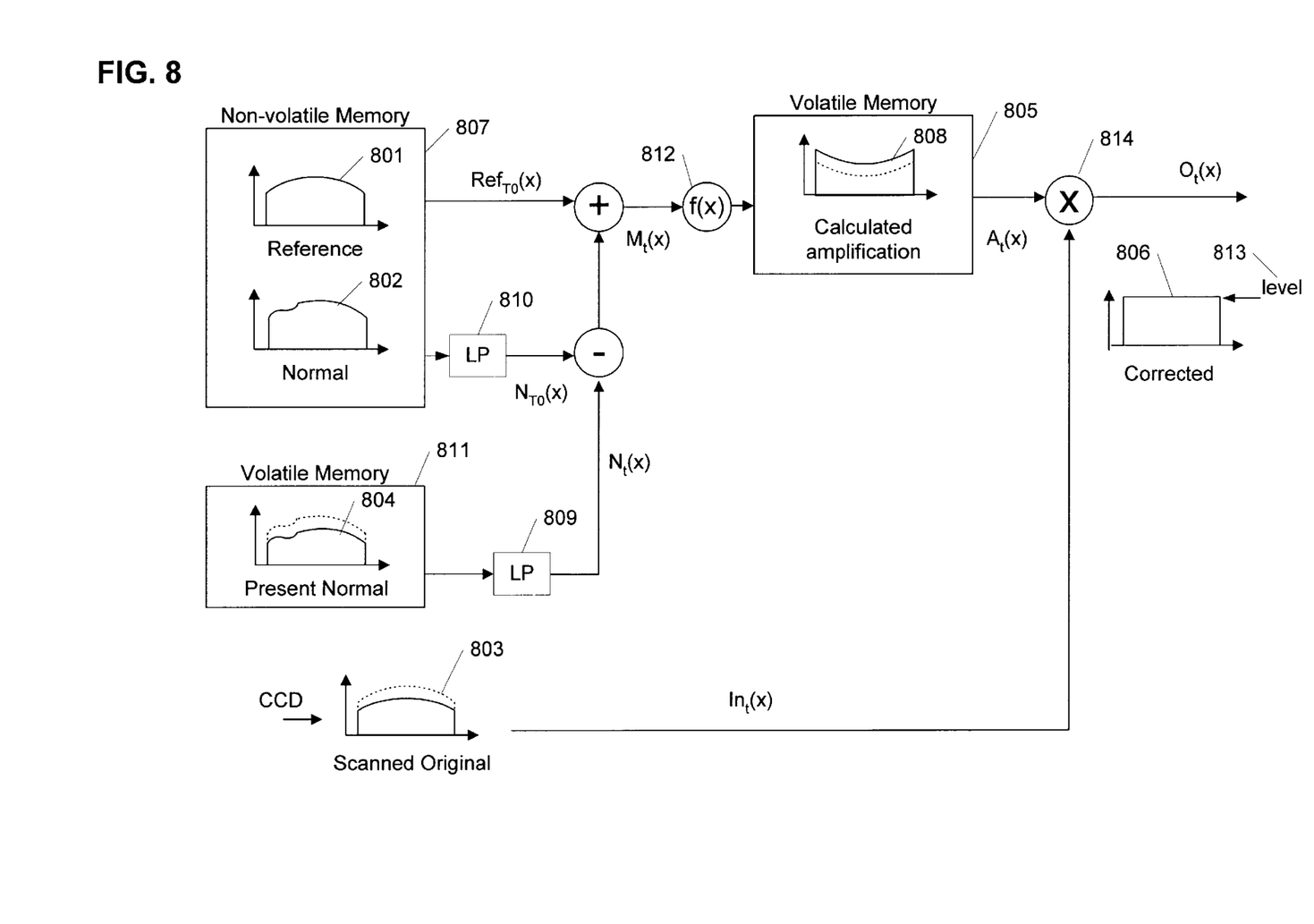
FIG. 8 shows the implementation of pixel correction using modified amplification values according to the invention, when the stored line profile data is different from the line profile data from the colour line sensors.

FIG. 8 shows the implementation of pixel correction using modified amplification values according to the invention, when the stored line profile data is different from the line profile data from the colour line sensors. This illustrates the effect of a change in the environment (light source, lens system, CCD pixel sensitivity etc). The figure is similar to FIG. 7, but it is assumed that the line profile data from the normal background at time t has changed, compared to the line profile data from the normal background stored at time To. This is illustrated in the lowered line profile data for the normal background 804 stored in volatile memory 811 and in the lowered input 803 from an original being scanned.

The difference between $N_t(x)$ and $N_{TO}(x)$ will offset the modified line profile data, and this will be reflected in the higher calculated amplification values 808.

After multiplication of $A_t(x)$ and $In_t(x)$ through multiplier 814, the result is the corrected output signal 806, which has maintained the desired output level 813.

It is important to notice that the combination of the two operations—calculating the amplification values and the following multiplication—is only an example. Any combination of an operator and the inverse operator is possible (e.g. using a look-up table instead of a multiplier).

Whereas the generation of the stored sets of reference line profile data is time-consuming and requires a physical insertion (either manual or automatically) of the white reference background and should be performed e.g. once a day or once in several days, the calculation of amplification values based on the stored and the present line profile data is very fast, and can be done e.g. before a scan or a group of scans or alternatively at regular time intervals or as a continuous process.

Figure 9:
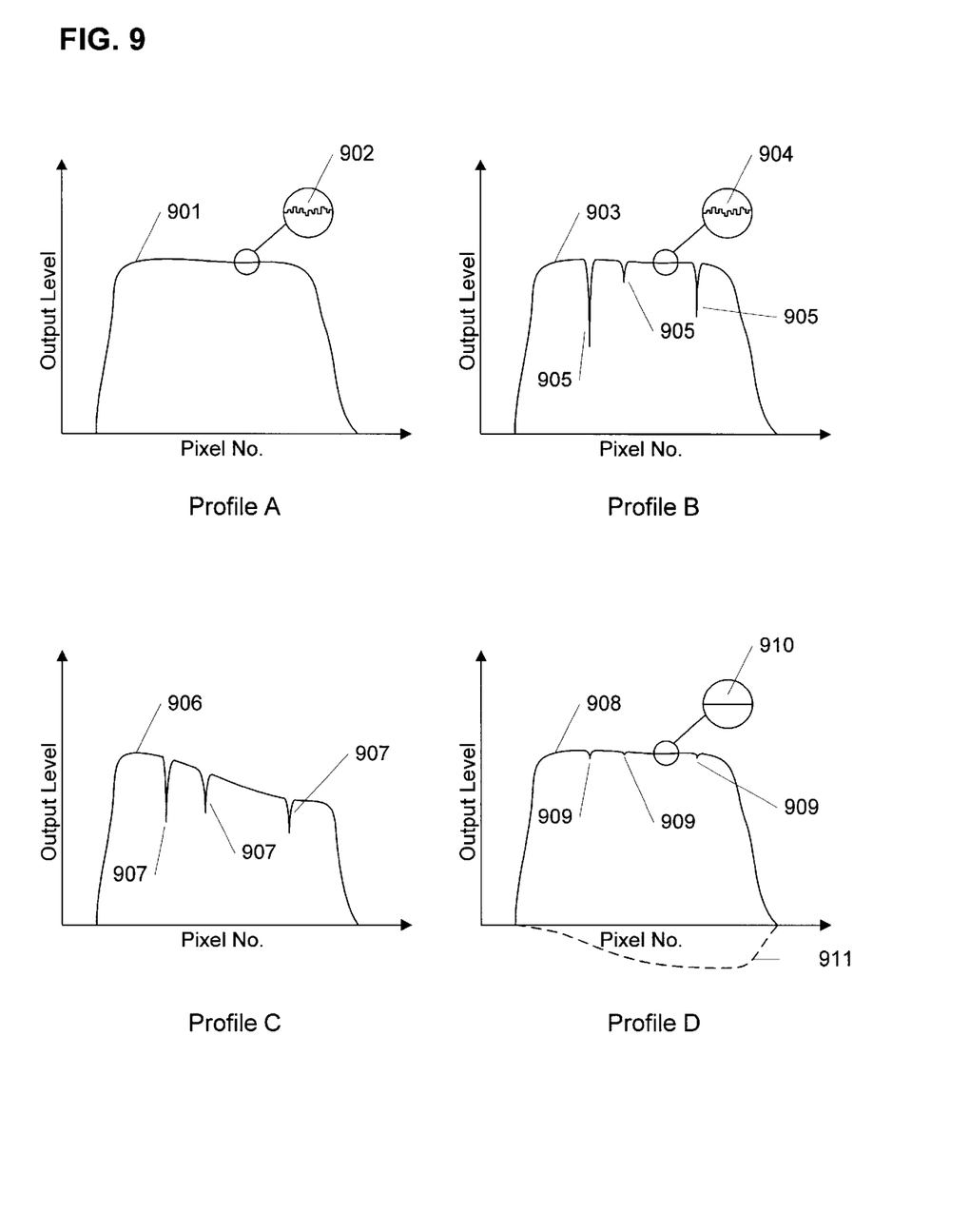
FIG. 9 shows examples of selected sets line profile data.

FIG. 9 shows examples of selected line profile data. At Profile A, an example of the line profile data 901 obtained by scanning the uniform white reference is shown. The profile 901 corresponds eg to the line profile data $Ref_{TO}(x)$ on FIG. 8. The profile 901 shows the slow variation arising from the illumination of the light source. Ideally the profile should be a straight line in the field of view and drop to zero outside the field of view. By field of view is understood pixels of which the camera is capable to detect intensity levels when the camera and the document are held fixed relative to each other. Differences in the light source, lens system and CCD pixel sensitivity along the line of CCD pixels, result in a skewed line profile like the one depicted.

In the blow-up, the across pixel variation 902 arising due to different sensitivities of the individual intensity detectors is shown. This across pixel variation 902 is more a high-frequent variation compared to the variation of the profile 901 due to the light source.

On Profile B, the line profile data 903 obtained by scanning the normal white background is shown. These line profile data 903 correspond e.g. to the line profile data $N_{TO}(x)$ before the low-pass filter 810 (that is, the stored line profile data 802) on FIG. 8. Usually, the norm al white background becomes after some use usually scratched and dirty at same points after some use. The background will at these points not reflect as much light as is the case for a clean and non-scratched background. This can be witnessed as localised notches 905 at these points in the line profile data.

In the blow-up the across pixel variation 904 arising due to different sensitivities of the individual intensity detectors are shown. This across pixel variation 904 is a more high-frequent variation compared to the general variation of the line profile data 903 due to variations in the light source.

In the prior art the line profile data 903 would just be low-pass filtered in order to reduce/eliminate the notches 905 but this removes the across pixel variations 904 as well.

Profile C shows the line profile data 906 obtained by scanning the white background at a time where the line profile data have changed from the initially obtained line profile data due to temperature changes and/or ageing of the light source. This results in a change of the low-frequency level which needs to be compensated for. These line profile data 906 corresponds eg to the line profile data $N_t(x)$ before the low-pass filter 809 (that is, the temporarily stored line profile data 804) in FIG. 8.

Profile D shows the line profile data 911 that are the difference between the line profile data 903 and the line profile data 906, after both have been low-pass filtered. The line profile data 911 are a measure of how much the line profile data 903 have changed due to temperature changes and/or ageing of the light source. The line profile data 911 are the changes that the line profile data 901—which still contain information about the across pixel variation of the CCD-elements—have to be compensated for.

Also shown is the line profile data 908, which are generated by low-pass filtering the line profile data 903. The line profile data 908 correspond e.g. to the line profile data $N_{TO}(x)$ in FIG. 8. As can be seen the notches 909 have reduced in size (and thereby the noise) but the across pixel variation 910 shown in the blow-up is lost.

Figure 10:
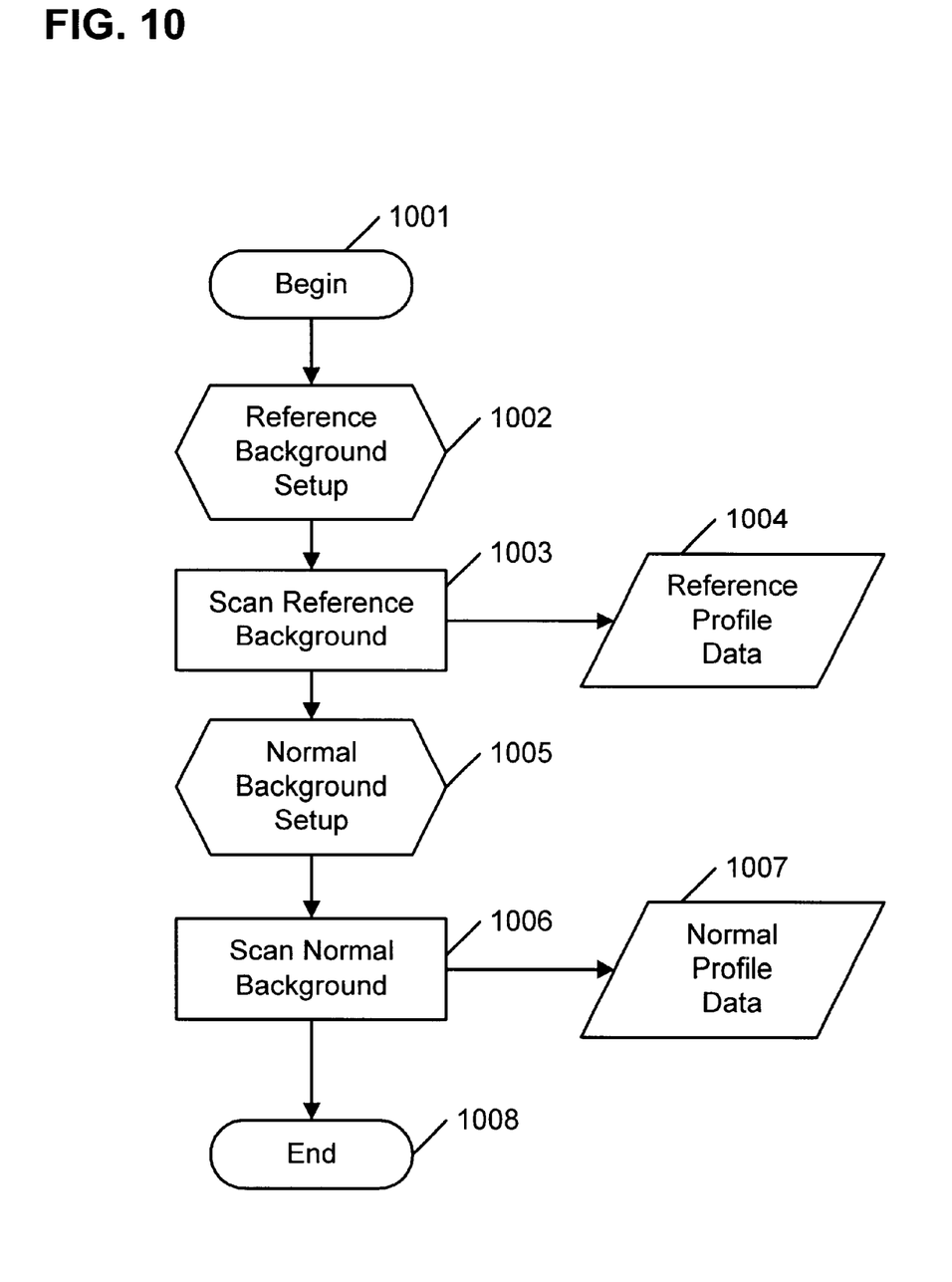
FIG. 10 shows a flowchart for a method of initially obtaining line profile data.

FIG. 10 shows a flowchart for a method of initially obtaining the line profile data. In step 1001 the method or procedure of obtaining the line profile data is entered. In step 1002 the scanner is prepared to perform a scan of a uniform white reference. This includes either manually or automatically inserting the uniform white reference background in front of the normal white background. In another embodiment moving the camera or the optics or the like away from the normal white background towards a fixed uniform reference background could achieve the same effect. Next in step 1003 the completely uniform white reference is scanned. This scan ensures that the across pixel variations are captured. The scan can preferably be performed several times e.g. 128 and averaged in order to reduce noise in the signal. The resulting scan is thus obtained by taking the average of these several scans. In step 1004 the reference line profile data are stored in a memory storage which preferably is a non-volatile memory storage but other kind of memory storage can be used. In step 1005 the scanner is prepared to perform a scan of the normal white background. The uniform white reference background is either manually or automatically removed to reveal the normal white background. In another embodiment the camera or optics is moved back to face the normal white background. In step 1006 the scan of the normal white background is done either once or as an average of a multiple number of scan lines in order to reduce the noise. The line profile data are stored at 1007 in a memory storage. This memory storage could preferably be a non-volatile memory. In step 1008 the sub-procedure ends.

Figure 11:
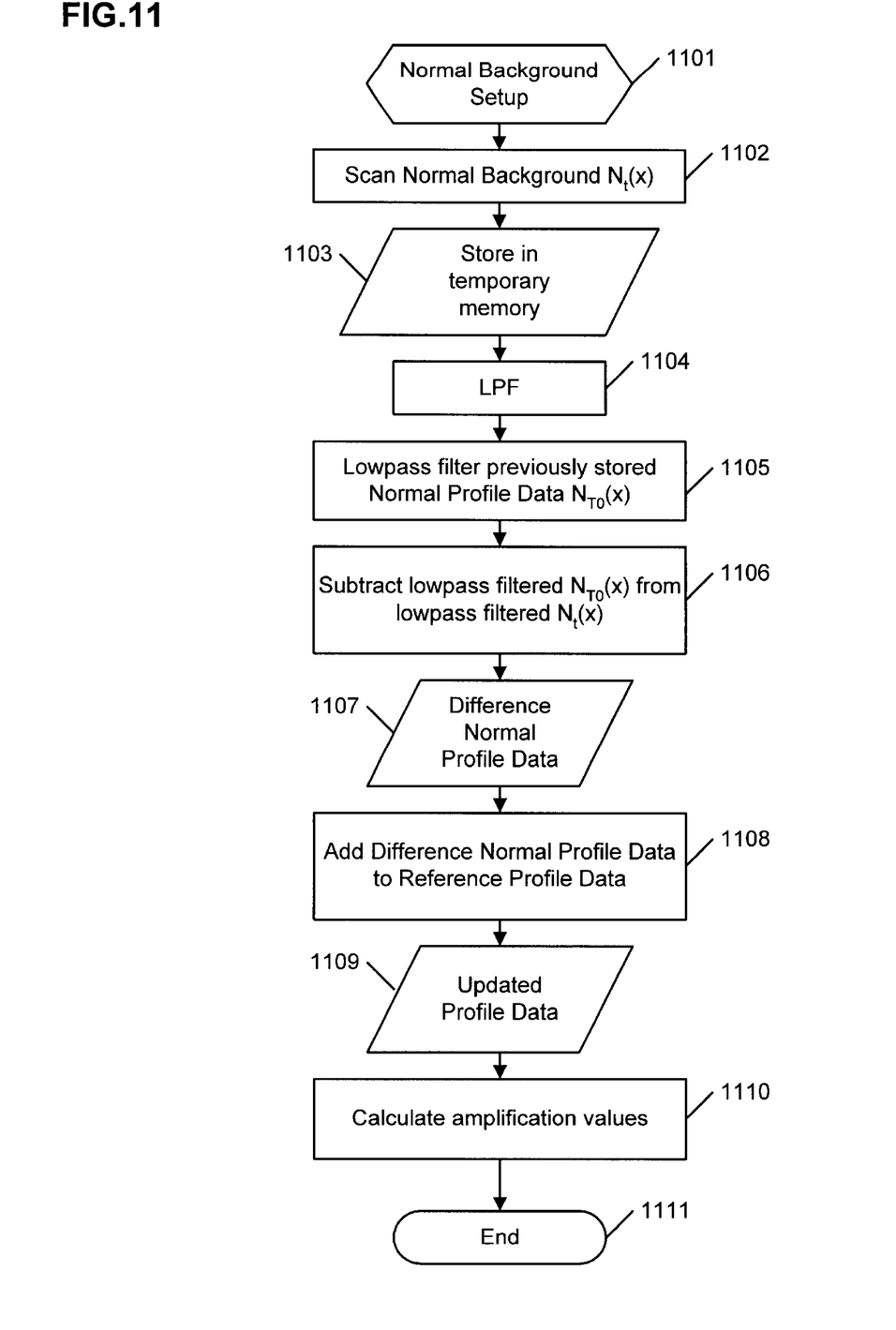
FIG. 11 shows a flowchart for a method of obtaining and processing data for correcting the intensity profile in an optical scanner.

FIG. 11 shows a flowchart for a method of obtaining and processing data for correcting the intensity profile in an optical scanner. In step 1101 the scanner is prepared to perform a scan of the normal white background. If the uniform white reference background is present it is either manually or automatically removed to reveal the normal white background. In step 1102 the scan of the normal white background is performed either once or as an average of a multiple number of scan lines in order to reduce noise. In step 1103 the line profile data for the normal white background are stored in a temporary memory storage. This memory storage could preferably be a volatile memory. In step 1104 the line profile data are low-pass filtered by e.g. a median filter to give a smoothed profile where the small variations for scratches, dirt, etc. on the background are removed. This data represents the updated/current level of the line profile data since it changes due to temperature changes and ageing of the light source.

In step 1105 the initially obtained line profile data for the normal white background stored in the non-volatile memory are low-pass filtered by e.g. a median filter to give a smoothed profile where the small variations for scratches, dirt, etc. on the background are eliminated.

In step 1106 the updated line profile data for the normal white background and the low-pass filtered initially obtained line profile data for the normal white background are subtracted in order to obtain data for the change of the level of the line profile data due to temperature changes and ageing of the light source. This results in the generation of the smoothed 'Difference Normal Profile Data' stored in step 1107. Since this data is smoothed the information of the across pixel variations due to intensity variations in the camera e.g. CCD-elements are lost. In order to regain this information the 'Difference Normal Profile Data' and the 'Reference Profile Data' which has the across pixel intensity variations intact are added in step 1108. This data is stored in step 1109 as 'Updated Profile Data', which comprises information of both across pixel intensity variations and of the change in intensity level due to temperature change and ageing of the light source.

Based on this 'Updated Profile Data', the modified amplification values are calculated and stored in volatile memory in step 1110. In step 1111 the sub-procedure ends.

Generally, it should be noted that an optical scanner according to the invention can be controlled by a computer having a memory. Further, the memory can include a program for determining the operation of the scanner.

What is claimed is:

1. A method of compensating for pixel variations in an optical scanner that comprises a light source and a line detector detecting pixel intensity information, the method comprising the steps of:

initially generating pixel specific line profile data that comprises pixel intensity information by scanning a reference, and storing the pixel specific line profile data;

initially generating first smoothed line profile data that comprises pixel intensity information by scanning a background, and storing the first line profile data to represent intensities along the a line at a first point in time;

when required generating second smoothed line profile data that comprises pixel intensity information by scanning the background, and storing the second line profile data to represent intensities along the line at a second point in time;

generating the difference between said first smoothed line profile data and said second smoothed line profile data to represent changes in the intensities along the line;

generating a combination of said difference and said pixel specific line profile data;

using said combination to compensate for temporal and along-line changes in pixel intensities in the optical scanner.

2. A method according to claim 1, wherein said difference is calculated as a subtraction operation.

3. A method according to claim 1, wherein said combination is calculated as an addition operation.

4. A method according to claim 1, further comprising the step of placing a reference in front of the line detector prior to generating the line profile data.

5. A method according to claim 1, further comprising the step of directing the line detector to detect intensity information from a fixed reference prior to generating the line profile data.

6. A method according to claim 1, further comprising the step of generating said line profile data by scanning the reference a number of times and calculating the average over the number of scans.

7. A method according to claim 1, further comprising the step of generating said smoothed line profile data by scanning the reference a number of times, calculating the average over the number of scans, and low-pass filtering the average.

8. A method according to claim 1, wherein said second smoothed line profile data are obtained by low-pass filtering.

9. A method of compensating for pixel variations in an optical scanner that comprises a light source and a line detector detecting pixel intensity information, comprising the steps of:

initially scanning a reference and a background in order to generate line profile data and first smooth line profile data respectively, wherein the first line profile data represents intensities along a line on the background at a first point in time;

compensating detected pixel intensities during scanning of a document by means of said line profile data;

when required, scanning the background in order to obtain second smooth line profile data that represents intensities along a line on the background at a second point in time;

further compensating detected pixel intensities during scanning of a document for along-line changes in said second smooth line profile data relative to said first smooth line profile data.

10. A method according to claim 9, further comprising the step of placing a reference in front of the line detector prior to generating the line profile data.

11. A method according to claim 9, further comprising the step of directing the line detector to detect intensity information from a fixed reference prior to generating the line profile data.

12. A method according to claim 9, further comprising the step of generating said line profile data by scanning the reference a number of times and calculating the average over the number of scans.

13. A method according to claim 9, further comprising the step of generating said smoothed line profile data by scanning the reference a number of times, calculating the average over the number of scans, and low-pass filtering the average.

14. A method according to claim 9, wherein said second smoothed line profile data are obtained by low-pass filtering.

15. An optical scanner comprising:

a light source;

a line detector detecting pixel intensity information;

a computer having a memory wherein the computer is capable of controlling the optical scanner such that the detected pixel intensity can be adjusted and wherein the memory holds a procedure comprising the steps of:

initially generating line profile data that comprises pixel intensity information by scanning a reference, and storing the line profile data;

initially generating first smoothed line profile data that comprises pixel intensity information by scanning a background, and storing the first line profile data to represent intensities along a line at a first point in time;

whenever required generating second smoothed line profile data that comprises pixel intensity information by scanning the background, and storing the second line profile data to represent intensities along the line at a second point in time;

generating the difference between said first smoothed line profile data and said second smoothed line profile data to represent changes in the intensities along the line;

generating a combination of said difference and said line profile data;

adjusting the detected pixel intensity to compensate for temporal and along-line changes in pixel intensities in the optical scanner.

16. A method according to claim 15, wherein said difference is calculated as a subtraction operation.

17. A method according to claim 15, wherein said combination is calculated as an addition operation.

18. An optical scanner according to claim 15, wherein said optical scanner is of the roll-through scanner type where a document subject for scanning is moved past the line detector.

19. An optical scanner according to claim 15, comprising a reference that can be placed in front of the line detector.

20. An optical scanner according to claim 19, wherein said reference has the same colour and intensity over a surface subject for scanning.

21. An optical scanner according to claim 15, comprising a fixed reference and means for directing the line detector to detect intensity information from said fixed reference.

22. An optical scanner according to claim 15, comprising averaging means for calculating the detected intensity average over a number of scans.

23. An optical scanner according to claim 15, comprising a low-pass filter for filtering the pixel intensity information.

* * * * *